United States Patent [19]

Toizumi et al.

[11] Patent Number: 4,816,935

[45] Date of Patent: Mar. 28, 1989

[54] VIDEO FLOPPY SYSTEM

[75] Inventors: Yasushi Toizumi, Hachioji; Dai Kawase, Kunitachi, both of Japan

[73] Assignee: Olympus Optical Co., Ltd., Tokyo, Japan

[21] Appl. No.: 83,678

[22] Filed: Aug. 7, 1987

[30] Foreign Application Priority Data

Aug. 8, 1986 [JP] Japan .................. 61-186625

[51] Int. Cl.$^4$ .............................................. G11B 5/03
[52] U.S. Cl. ................................. 360/66; 360/78.13; 360/78.14
[58] Field of Search .......................... 360/33.1, 66, 97; 358/342, 355

[56] References Cited

U.S. PATENT DOCUMENTS

| | | | |
|---|---|---|---|
| 3,882,541 | 5/1975 | Ghose et al. | 360/78 |
| 4,131,923 | 12/1978 | Wachs et al. | 360/106 |
| 4,315,289 | 2/1982 | Holecek et al. | 360/99 |
| 4,383,283 | 5/1983 | Machut | 360/97 |
| 4,442,463 | 4/1984 | Krishnamurty et al. | 360/66 X |
| 4,651,247 | 3/1987 | Fuke | 360/106 |

FOREIGN PATENT DOCUMENTS

| | | |
|---|---|---|
| 57-21133 | of 1982 | Japan . |
| 59-3754 | 1/1984 | Japan . |
| 59-3752 | 1/1984 | Japan . |
| 59-3753 | 1/1984 | Japan . |
| 59-92253 | 6/1984 | Japan . |
| 60-64464 | 5/1985 | Japan . |
| 60-67562 | 5/1985 | Japan . |
| 6067564 | 5/1985 | Japan . |
| 60-186557 | 12/1985 | Japan . |
| 60-192160 | 12/1985 | Japan . |
| 60-192161 | 12/1985 | Japan . |
| 60-192162 | 12/1985 | Japan . |
| 60-192163 | 12/1985 | Japan . |
| 60-192168 | 12/1985 | Japan . |
| 61-6966 | 1/1986 | Japan . |
| 61-6967 | 1/1986 | Japan . |
| 61-6968 | 1/1986 | Japan . |

OTHER PUBLICATIONS

Nikkei Electronics, Jul. 2, 1984, pp. 80-85; published by Nikkei McGraw-Hill. Title: Recording 25 Still Pictures on a Floppy Disc of 47 mm in Diameter–Standard of Magnetic Disks for Electronic Still Cameras.

Primary Examiner—Eugene R. LaRoche
Assistant Examiner—David Mis

[57] ABSTRACT

A system for automatically erasing a pair of tracks whenever a designated track to be erased belongs to a pair of tracks representing a frame picture.

In the system, detecting means detects ID codes indicating field/frame recording mode of a recorded track and feeds a detected signal to a controller, then the controller takes an appropriate action to erase the pair of frame recorded tracks by timely activating head accessing means and an erasing signal generator based on the ID codes, whenever the tracks correspond to a frame picture.

10 Claims, 5 Drawing Sheets

(BIT ALLOCATION OF ID CODES)

where "H" is the horizontal scanning line.

VIDEO FLOPPY SYSTEM

BACKGROUND OF THE INVENTION

1. Field of the Invention

This invention relates to a floppy system which is particularly useful for erasing information from a desired track formed on a floppy disc.

2. Description of Prior Art

In recent years, systems such as an electronic still camera or a still video floppy disc player have been developed for recording still video signals on a floppy disc, a so-called disc pack, and reproducing the recorded images on a television tube. In order to record video information on a floppy disc, there are two types of recording techniques: field recording and frame recording. In field recording, the information for one field is recorded on one track to form a field picture. In frame recording, the information for a first field is recorded on one of two adjacent tracks (for example, the outer track) and the information for a second field is recorded on the other track (for example, the inner track), thus one frame of picture is obtained from the information for the first and second fields recorded on a pair of tracks.

For the electronic still cameras, uniform standards have been already established by The Electronic Still Camera Conference with respect to various items such as video recording format, etc. According to the standards, both field recording and frame recording are allowed for recording video signals on a magnetic recording medium (floppy disc). Therefore, it is provided that the data for discriminating between field recording and frame recording should be prerecorded so that the type of recording can be identified at the time of reproducing the image. The signal recorded for enabling the identification is called an identification (ID) code and is multiplexed with the video signal on the recording medium. That is, it is provided that a frame type recorder should make the frequency multiplexing of the ID codes of the field/frame recording on the video track. According to the standards, the frequency of the carrier for the recording of the identification data is 13 times the horizontal sync frequency $f_H$ (i.e., 204.54 KHz in the NTSC system), the modulation system is DPSK (Differential Phase Shift Keying), and the bit rate is such that one bit corresponds to the interval of 4H (H represents one horizontal scanning line period). (See Nikkei Electronics, July 2, 1984, etc.)

Figure 7:
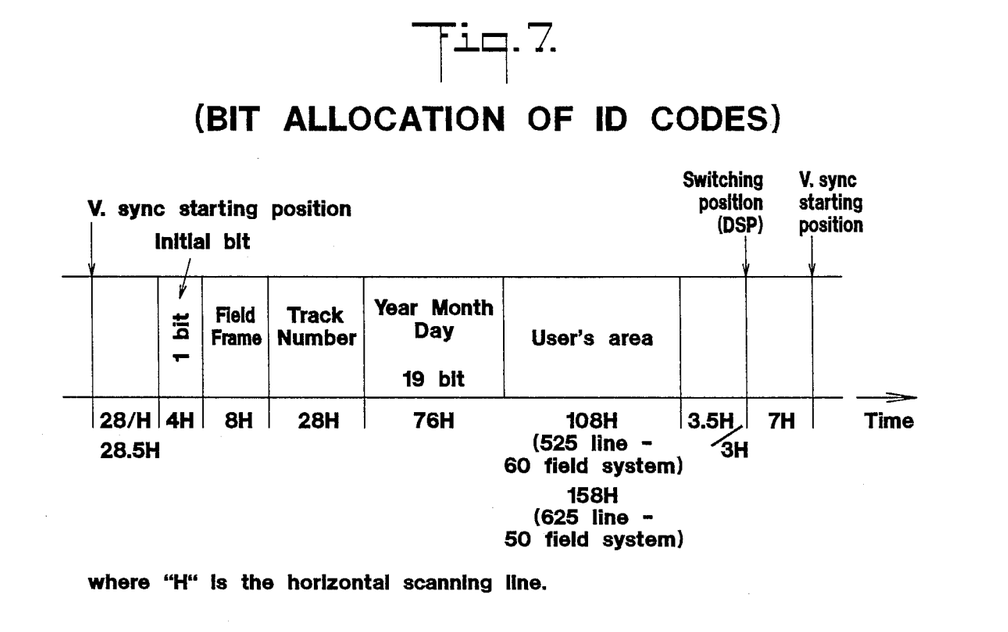
FIG. 7 is a diagram showing bit allocation of identification (ID) codes in accordance with the standards for electronic still cameras.

Further, bit allocation of ID codes is made as shown in FIG. 7. An interval of 4H (i.e., the interval of one bit) after the start point (front edge) of vertical synchronizing signal (V. SYNC) is the initial bit and an interval of 8H (i.e. the interval of two bits) following the initial bit is assigned for the ID codes of the field/frame recording. The two bit data "00" in the interval correspond to field recording and the data "01" or "10" correspond to frame recording. In the latter case, the data "01" and "10" represent the outer and inner tracks of a pair of frame-recorded tracks, respectively.

As explained above, the recording of a video signal on a floppy disc in an electronic still camera is made together with the ID code signal for each recording track and field and frame recordings may often coexist on the same floppy disc. As is well known, it is possible to rewrite or erase recorded information on any track of a floppy disc. However, in a floppy disc where field and frame recordings coexist, a problem arises when the information recorded on an arbitrary track is erased. If the erased track is a field-recorded track, video information for one frame of picture is erased, which causes no concern. However, if the erased track is one of a pair of frame-recorded tracks, the other track remains unerased. The unerased track continues to have the ID code signal representing that it is one of a pair of frame-recorded tracks (for example the outer track). When the unerased track is reproduced, it is identified as a frame-recorded track and either two different images or one field image and a unrecorded portion will be reproduced as one frame of picture, which causes inconvenience.

SUMMARY OF THE INVENTION

Systems in accordance with the invention provide control of the head positioning and exciting based on the ID codes previously detected from record tracks intended to be erased. The systems automatically erase a group of tracks on which are recorded respective portions of unitary amount of information.

A specific example of a system in accordance with the invention is suitably applicable to erase a pair of frame recorded tracks on a video floppy disc based on the ID codes recorded with the video signal using the frequency division multiplexing method. As explained above, in conformity with the standard specifications for a recording system on a magnetic disc, the Still Video Floppy System provided by The Electronic Still Camera Conference, the ID code indicates whether a track played back consists of a field picture or a frame picture, and this code shall be recorded whenever a frame picture is recorded. An example of a system comprises means for detecting ID code so as to determine whether a track to be erased is a field recorded track or a frame recorded one and further determine whether a frame recorded track is an outer side track or an inner side track. Then, the system takes appropriate action to erase a pair of frame picture tracks entirely including one previously intended to be erased based on the above-mentioned determination.

BRIEF DESCRIPTION OF THE DRAWINGS

In the accompanying drawings:

FIG. 3 (a) is a plan view showing a motion transmitting mechanism of the system shown in FIG. 2;

FIG. 3 (b) is a reversed, detailed plan view, on an enlarged scale, of a portion b of a cam in FIG. 3(a);

DESCRIPTION OF THE PREFERRED EMBODIMENTS

Figure 1:
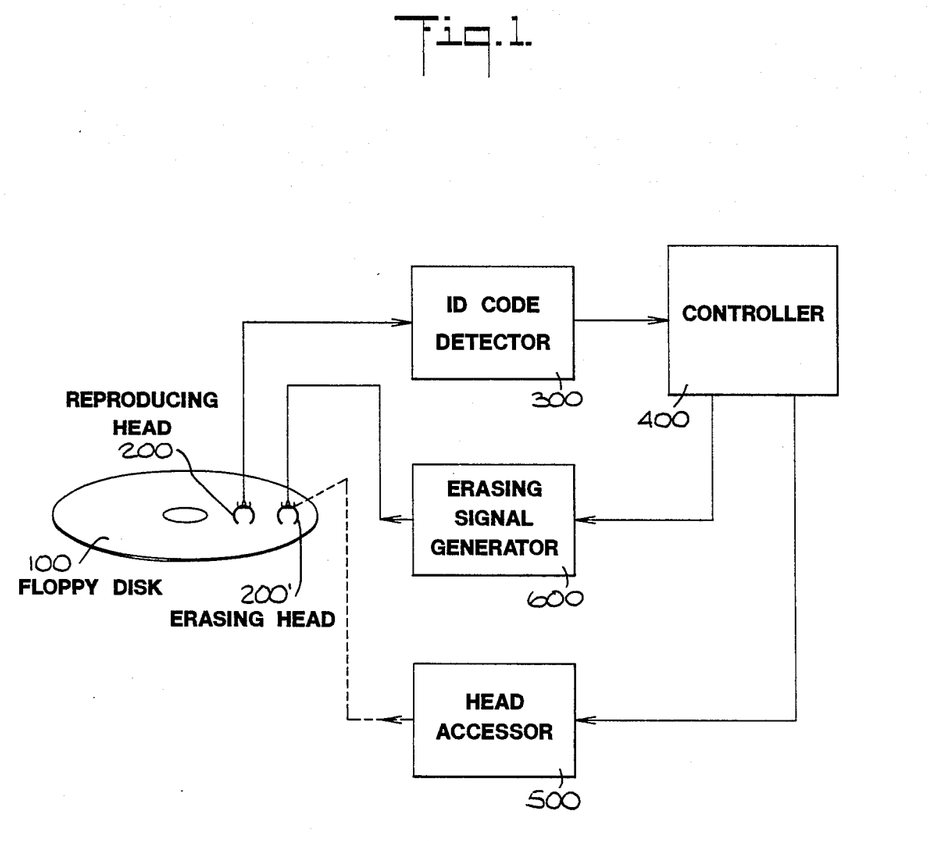
FIG. 1 is a diagram showing the general formation of the invention.

Systems in accordance with the invention may be used in a number of recording systems utilizing a magnetic disc contexts, but particularly useful applications are found in still video floppy systems, a particular example of which is shown in FIG. 1.

FIG. 1 is a simplified block diagram showing the principal subsystems, generically defined, utilized in a recording system employing a floppy disc 100 as a recording medium. In the system, a reproducing head 200 is provided to pick up information from the floppy disc 100 and an erasing head 200' is provided to erase the information recorded on a track formed on the disc 100. An ID code detector 300 detects an ID code signal from an output signal of the reproducing head 200 and supplies the ID code signal to a controller 400. The controller 400 controls a head accessor 500 and an erasing signal generator 600 based on the ID code signal. The head accessor 500 advances the erasing head 200' to a track to be erased and, then the erasing signal generator 600 feeds an erasing current to the erasing head 200' for exciting the head 200' so as to erase information on the track in response to control signals fed from the controller 400. A group of tracks are automatically erased by appropriate head positioning and timely exciting of the erasing head 200' under the command of the controller 400, whenever the controller determines, based on the ID codes, that the tracks all contain portions of the same
information distributively recorded.

Figure 2:
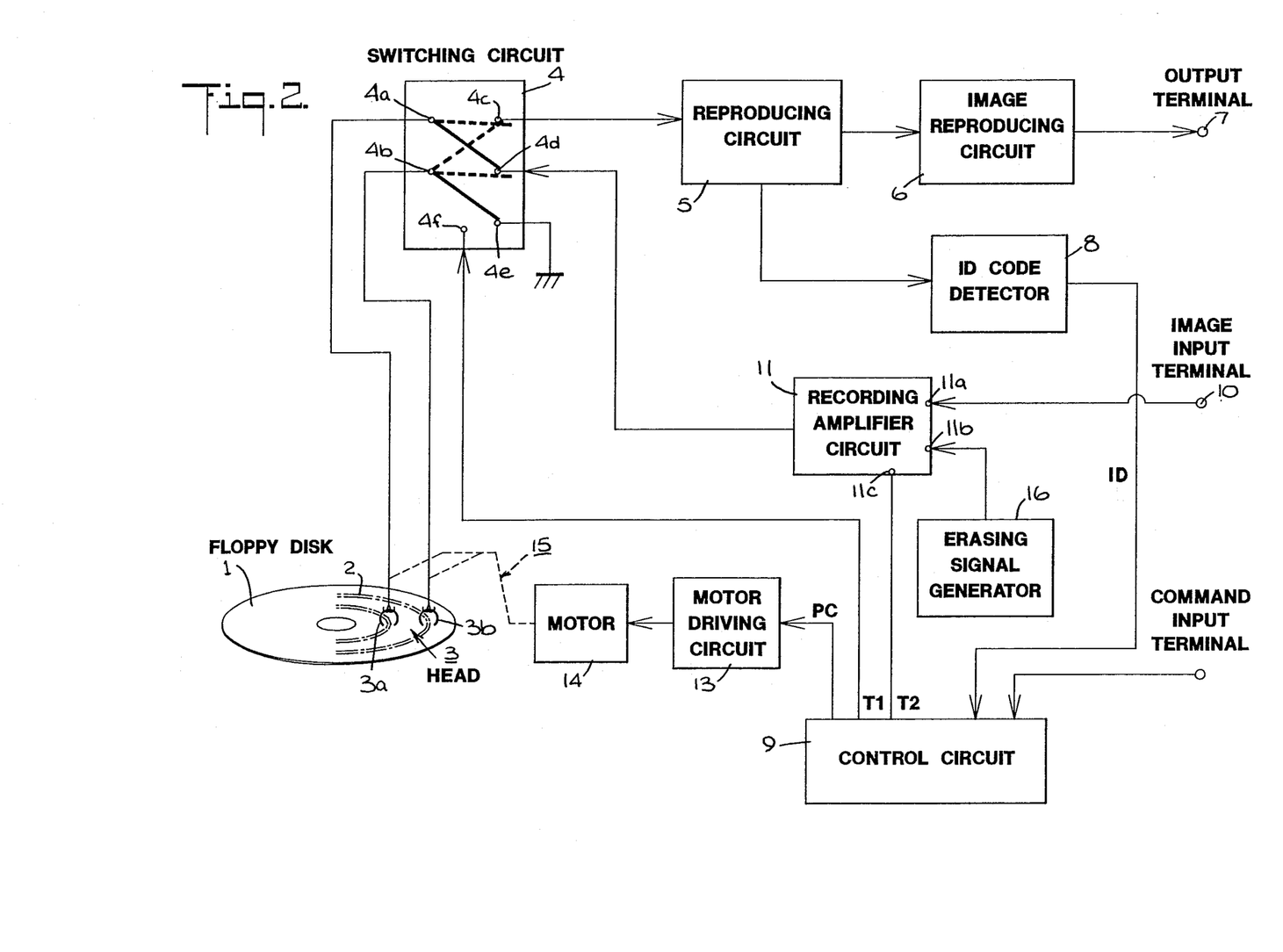
FIG. 2 is a block diagram showing an electric circuit of a system as an embodiment of the present invention.

FIG. 2 is a block diagram showing an electric circuit portion of an apparatus according to the present invention adapted to be used for a still video floppy disc player. In FIG. 2, a still video floppy disc 1 is provided with a plurality of concentric annular tracks 2, to and from which signals are given and received respectively by a multihead 3 of the two-channel type. The head 3 is an in-line head which includes an inner head 3a positioned inwardly and an outer head 3b positioned outwardly in the radial direction of the floppy disc 1, with their head gaps aligned in the radial direction. The inner head 3a and the outer head 3b are connected to a first terminal 4a and a second terminal 4b of a switching circuit 4, respectively. The switching circuit 4 further includes a third terminal 4c, a fourth terminal 4d, a fifth terminal 4e (grounded) and a sixth terminal 4f, and the first and second terminals 4a and 4b are selectively connected with the third, fourth and fifth terminals 4c, 4d and 4e in response to the external signals applied to the sixth terminal 4f. In reality, the sixth terminal 4f comprises a plurality of terminals corresponding to the number of external signal lines. The third terminal 4c of the switching circuit 4 is connected to the input of a reproducing circuit 5 for amplifying to a predetermined level the signals detected by the head 3.

One of two outputs of the reproducing circuit 5 is connected to the input of an image reproducing circuit 6 for processing the video signal to demodulate and display it on a monitor, and the output of the image reproducing circuit 6 is connected to an image output terminal 7. The other output of the reproducing circuit 5 is connected to the input of an ID code detector 8 for demodulating the data signal (ID signal) multiplexed with the video signal as stated above, and the output data of the ID code detector 8 are supplied to an input of a control circuit 9. An image input terminal 10 is provided for receiving from the outside a video signal to be recorded and the terminal 10 is connected to a first terminal 11a of a recording amplifier circuit 11. The recording amplifier circuit 11 further has a second input terminal 11b and a third input terminal 11c. The recording amplifier circuit 11 includes an amplifying circuit, a modulating circuit, a changeover switching circuit, etc., all of which are known in themselves, and is so constructed as to, in response to a signal supplied to the third input terminal 11c, selectively either modulate by the video signal supplied to the first input terminal 11a, an FM signal of a predetermined level suitable for recording and output the modulated signal, or amplify to a sufficiently high level an erasing signal supplied to the second input terminal 11b and output the amplified erasing signal. The control circuit 9 includes for example a microcomputer and is designed so that various command signals for designating the number of a track to be erased, commanding the erasing operation, etc., are fed to the control circuit 9 through a command signal input terminal 12 and that the control circuit 9 receives the ID code signal from the ID code detector 8 and supplies timing signals T1 and T2 to the sixth terminal 4f of the switching circuit 4 and the third input terminal 11c of the recording amplifier circuit 11, respectively. The control circuit 9 further supplies to a motor driving circuit 13 a position control signal PC for controlling the position of the head 3. The motor driving circuit 13 is so constructed as to, in response to the position control signal PC, supply electric power to a motor 14 for rotating the motor 14 by an angle corresponding to the signal PC. The rotational motion of the output shaft of the motor 14 is converted to linear motion through a motion transmitting mechanism 15 schematically shown by the broken line in FIG. 2 and is transmitted to the head 3. As specifically described below, this embodiment employs a characteristic mechanism as the motion transmitting mechanism 15. Further, the second input terminal 11b of the recording and amplifying circuit 11 is to receive the output of an erasing signal generating circuit 16 for generating an erasing signal which is an alternating current signal of a relatively high level for erasing the record of the floppy disc 1.

The operation of the electric circuit of the present system will now be described. It is assumed that the command to erase the n-th track is inputted to the control circuit 9 through the command signal input terminal 12 by using an operation switch (not shown) etc. In response to the input, the control circuit 9 supplies to the motor driving circuit 13 a position control signal PC for shifting the inner head 3a of the head 3 of the n-th track position. In response to the output of the motor driving circuit 13, a motor 14 shifts the head 3 via a motion transmitting mechanism 15 so that the inner head 3a is positioned above the n-th track. The control circuit 9 can recognize a present position of the head 3 through known means, for example, a potentiometer, photoelectric encoder, or the like (not illustrated). When the inner head 3a is positioned above the n-th track, the first and third terminals 4a and 4c of the switching circuit 4 are connected to each other in response to the timing signal T1 from the control circuit 9 and the output detected by the inner head 3a is supplied to the reproducing circuit 5. One of the output signals of the reproducing circuit 5 is processed by the image reproducing circuit 6 and supplied to the image output terminal 7. If a monitor is connected to the terminal 7, the image recorded on the n-th track can be observed. The other output of the reproducing circuit 5 is supplied to the ID code detector 8. The ID code detector 8 demodulates the ID code signal modulated by the DPSK (Differential Phase Shift Keying) modulation method and multiplexed with the video signal and supplies the demodulated data to the control circuit 9. As explained above, according to the standards for electronic still cameras, when the data of two bits representing the field recording or frame recording are "00", it means that the track (in this case, the n-th track) is a field-recorded track; the data "01" and "10" mean the outer and inner tracks of frame-recorded tracks, respectively. The control circuit 9 discriminates among the demodulated data and correspondingly outputs the timing signals T1 and T2 and the position control signal PC.

In a first case where the n-th track is found to be a field-recorded track, the first and fourth terminals 4a and 4d of the switching circuit 4 are connected with each other in response to the timing signal T1 while the head 3 is not shifted in response to the position control signal PC. In addition the operation of the recording amplifier circuit 11 is changed over by the timing signal T2. That is to say, in the recording amplifier circuit 11, the first input terminal 11a normally receiving the signal from the image input terminal 10 is changed over to its isolated state and instead the erasing signal from the erasing signal generating circuit 16 is received through the second terminal 11b, amplified to a sufficient level for erasing operation and outputted. Then, the amplified erasing signal is supplied to the inner head 3a through the fourth and first terminals 4d and 4a of the switching circuit 4 and the information recorded in the entire circle of the n-th track is erased as the floppy disc rotates. Thus, the erasing operation of the field-recorded track is finished and the control circuit 9 returns to the standby condition.

Next, a second case where the n-th track is found to be the outer track of frame-recorded tracks will be described. First, the erasure of the n-th track itself is performed in the same manner as the erasure of the field-recorded track. Then, in response to the position control signal PC of the control circuit 9, the motor driving circuit 13, the motor 14 and the motion transmitting mechanism 15 operate so that the inner head 3a is shifted to the n+1-th track which is the next inner track with respect to the n-th track. After the head has been shifted, the changeover of the connection in the switching circuit 4 and the changeover of the operation of the recording and amplifying circuit 11 are made in the same manner as in the erasure of the field-recorded track and the amplified erasing signal is supplied to the inner head 3a to erase the n+1-th track. Thus, both the n-th and n+1-th tracks as a pair of tracks forming a frame picture are erased and then the control circuit 9 returns to the standby condition.

In a third case where the n-th track is found to be the inner track of frame-recorded tracks, again the erasure of the n-th track itself is made in the same way as the erasure of the field-recorded track in the above first case. Then, the changeover of the connection in the switching circuit 4 is performed by in response to the timing signal T1 while the head remains in the same position under the control of the position control signal PC. That is to say, in the switching circuit 4, the connection of the first and fourth terminals 4a and 4d established at the time of the erasure of the n-th track is released and instead the second and fourth terminals 4b and 4d are connected to each other. In addition, in response to the timing signal T2, the recording amplifier circuit 11 operates to amplify and output the erasing signal and the amplified erasing signal is supplied to the outer head 3b. Therefore, the n—1-th track, the next outer track with respect to the n-th track, is erased by the outer head 3b. Thus, both the n−1-th and n-th tracks as a pair of tracks forming a frame picture are erased and then the control circuit 9 returns to the standby condition.

Naturally, in the third case, if the capacities of the erasing signal generating circuit 16 and the recording amplifier circuit 11 are large enough, both the first and second terminals 4a and 4b of the switching circuit 4 may be connected to the fourth terminal 4d to supply the erasing signal to the outer and inner heads 3b and 3a simultaneously so that the n−1-th and n-th tracks forming a frame picture can be erased at the same time.

Further, many variations and modifications can be made within the scope of the present invention. It is possible that all of the tracks of the floppy disc 1 mounted on the present apparatus are previously scanned by the head 3 to detect the ID codes of each track, the result of which is stored in a memory of the control circuit 9, and that when the number of a track to be erased is designated by the command signal from the terminal 12, the recording mode field/frame is identified in accordance with the contents of the memory to make erasing operation. In this case, the head of the two-channel type always accesses a pair of frame-recorded tracks in a single action so that the two tracks can be erased simultaneously. Moreover, the head 3 in FIG. 2 which is of the in-line, two-channel type with both channels being used for recording, reproducing and erasing, may be replaced with a single head. Alternatively a head for erasing only may be provided in addition to a head for recording and reproducing. In these cases, it is necessary to provide head access to the second track of a pair of frame-recorded tracks to be erased. Except for this, their operation is substantially the same as the above-described operation of the embodiment shown in FIG. 2.

As described above, various heads may be used for erasing. However, when the erasing operation is made by a head which is not for erasing only, the following problem arises: when the erasing is made by a head having the same width as that of a head used for recording, it is possible that the side edge portions of a track cannot be completely erased because of the eccentricity of the floppy disc 1 at the time of its mounting; the expansion, contraction or distortion of the floppy disc 1 itself; the error of controlling the position of the head, etc. In order to resolve this problem, it has been proposed that the erasing of a track is made with the head shifted in the direction of width of the track to be erased while the floppy disc makes at least two revolutions, thereby preventing unerased portions from remaining (Japanese Published Utility Model Application No. 21133/1982). For that purpose, it is preferable that the shift pitch of the head in the direction of width of the track is fine. With such a fine shift pitch, however, high speed head access will be difficult and poses a new problem. Generally, in order to execute a relatively long shifting operation, such as a shift from track to track, using a high-resolution shifting mechanism capable of fine pitch shifting, it is necessary to provide a primary drive (for example, the rotation of a motor) of a great many steps or a very high speed of rotation.

In the present embodiment, in order to resolve such promblems, a very characteristic mechanism as described below is employed as the motion transmitting mechanism 15.

Figure 3A:
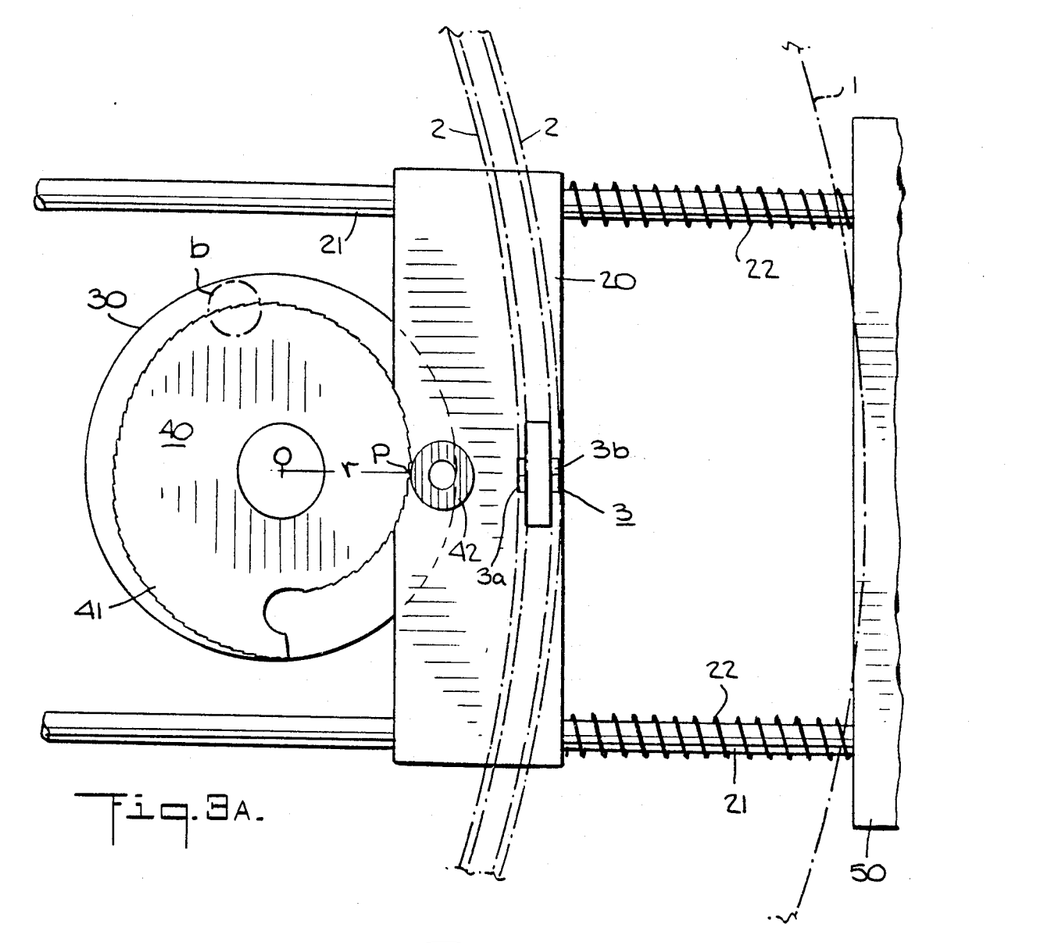
Figure 3B:
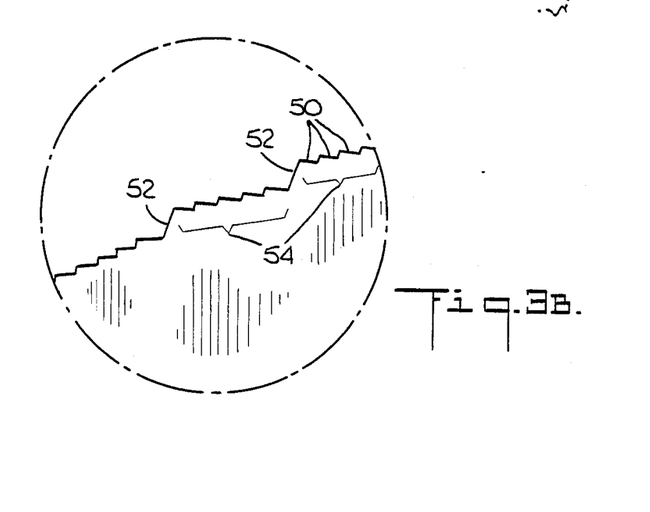
Figure 4:
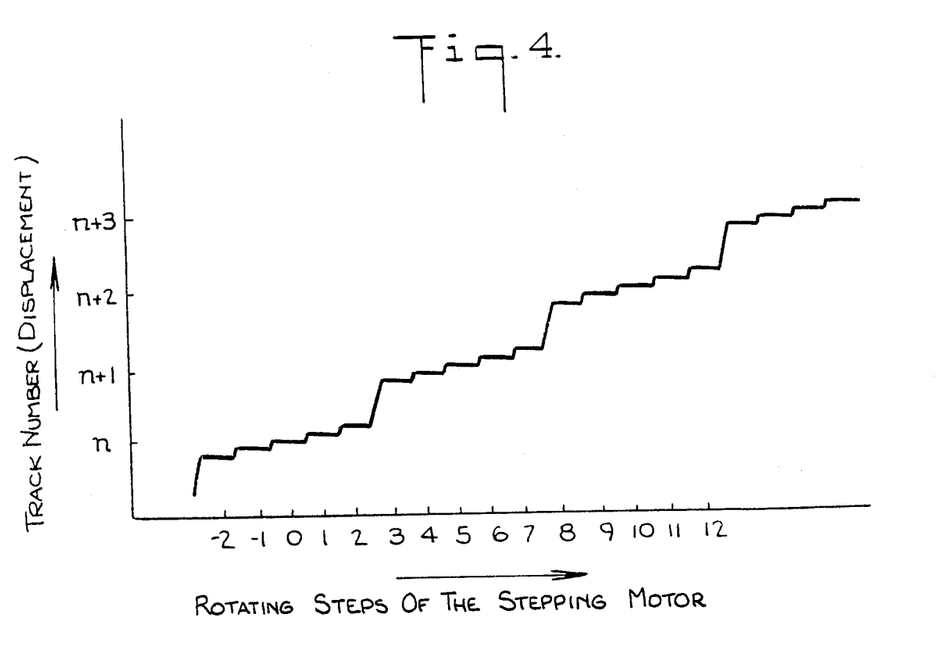
FIG. 4 is a graph depicting motion conversion characteristics of the mechanism in FIG. 3 (a)

FIG. 3(a) shows a motion transmitting mechanism of the system shown in FIG. 2. In FIG. 3(a), a head 3 is a head of the in-line, two-channel type having an inner head 3a and an outer head 3b. The head 3 is mounted on a movable head carriage 20 guided by two guide rods 21. A disc cam 41 which serves as a motion converting element is rotatably driven by a stepping motor 30 which is employed as the motor 14 in FIG. 2. The cam 41 and a cam follower 42 mounted on the carriage 20 to rollingly contact the cam 41 form a motion converting mechanism 40. Both guide rods 21 are fixedly secured at their right ends in FIG. 3(a) to a structural member 50 of the present apparatus. The left ends (not shown) of the guide rods are also fixed in the same way. Both guide rods 21 traverse insertion holes provided in the head carriage 20 to movably support and guide the head carriage 20. Compressible coil springs 22 are arranged around the peripheral surfaces of the guide rods 21 between the right side of the head carriage 20 and the left side of the structural member 50 shown in FIG. 3(a), thereby constantly exerting on the head carriage 20 a biasing force directed towards the cam 41. For this reason, the cam follower 42 mounted on the carriage 20 will always rollingly contact the cam 41 elastically. A still video floppy disc 1 is rotatably driven by a spindle motor (not shown) and is positioned as indicated by the dash-double dot line so that annular information recording tracks 2 formed on the floppy disc 1 can be traced by the head 3. In accordance with the present invention, the motion converting cam element 41 has a characteristic peripheral surface or edge as shown in FIG. 3(b), which is a reversed enlarged view of portion b of FIG. 3(a). As illustrated in FIGS. 3(a) and 3(b), the distance r between the axis of rotation O of the cam 41 and a position P on its peripheral surface contacting the cam follower 42 increases in the counterclockwise direction with fine step-by-step increments 50 and with larger incremental steps 52 at regular intervals. Each fine step-by-step incremental portion 54 constitutes a fine step pitch shifting region to provide the head 3 with a relatively fine displacement for ensuring complete erasure of a track to be erased without any unerased portion remaining along the side edges of the track and for proper tracking with respect to a specific track. Each larger step portion 52 constitutes a rough pitch shifting region to provide the head 3 with a relatively large abrupt displacement for the shift between the tracks. The motion conversion characteristics of the cam 41 will be understood more clearly from the graph of FIG. 4. In FIG. 4, the angle of rotation of the stepping motor 30 is represented on the horizontal axis by the number of steps and the displacement of the head (corresponding to the above-mentioned distance r) is represented on the vertical axis by the track number on the medium. With respect to the vertical axis, the distance between adjacent tracks, for example, is measured from the center of the n-th track to the center of the adjacent n+1-th track and is the so-called track pitch. For an electronic still camera, the standard pitch is 100 um.

The operation of the motion transmitting mechanism having the above-described structure will now be described. It is assumed that when the inner head 3a of the head 3 traces the regular position of the n-th track on the recording medium 1, the cam 41 is in its standard position of rotation, i.e., at the center step position of O in a fine step pitch shifting region 54 shown in FIG. 4. In reality, the track may be displaced from its regular position because of a positional error by a recording apparatus at the time of track recording, because of eccentricity or inexact displacement by a rotational drive in a reproducing apparatus, etc. Accordingly, at the time of erasing, it is necessary to shift the head in the direction of width of the track to make erasing operation during a plurality of revolutions of the medium and, at the time of reproducing, tracking control is necessary for finely displacing the head to follow the actual position of the track.

An example of erasing operation of the n-th track in the present embodiment will be described. In response to a command to erase the n-th track, the stepping motor 30 rotates the cam 41 to a position (the step position $-1$ in a fine step pitch shifting region shown in FIG. 4) which is one step before the standard position of rotation of the cam 41 where the head 3a traces the regular position of the n-th track. In this position, erasing current is supplied to the head 3a and the floppy disc is driven to make one revolution so that an annular portion of the n-th track including its outer side edge is circularly erased. Then, the cam 41 is rotated to its standard position of rotation for the n-th track (the center step position 0 in the fine step pitch shifting region shown in FIG. 4), where the head 3a performs circular erasure with respect to the standard position of the n-th track. Further, the cam 41 is rotated to a position (the step position 1 in the fine step pitch shifting region shown in FIG. 4) which is one step after the standard position of rotation of the cam 41 for the n-th track and in this position an annular portion of the n-th track including its inner side edge is circularly erased in the same way as described above. Clearly, the stepwise operation of the cam 41, therefore of the head 3a, is made in response to the position control signal PC from the control circuit 9 in FIG. 2. In the present apparatus, since an erasing operation is effectuated as described above, the annular area with its width extending from the standard position of the n-th track to the outer and inner side edges is circularly erased. Therefore, no unerased portions will remain along the sides or edges of the track. Although the erased area is extended by $\pm 1$ fine step in the above embodiment, the number of steps for erasing may be set arbitrarily, for example, $\pm 2$, if necessary. Of course, any order of tracks other than that from the outer to the inner track may be selected for erasure.

Next, the operation at the time of reproduction and head access will be described. In this embodiment, in order to effectuate tracking control for the n-th track, driving pulses are supplied from the motor driving circuit 13 in FIG. 2 to the stepping motor 14 (30 in FIG. 3(a)) to cause an angle of rotation of, for example, one or two steps (1 or 2 units on the horizontal axis in FIG. 4) in the positive direction (the counterclockwise direction in FIG. 3(a)), or one or two steps ($-1$ or $-2$ units on the horizontal axis in FIG. 4) in the opposite direction, whereby the fine step pitch shifting region 54 of the cam 41 operates to properly implement fine tracking control. Responding to fine stepping revolution of the cam 41, the cam follower 42 is relatively dislodged into an adjacent fine step of the cam 41 very easily. Accordingly, a delicate and very sensitive tracking control can be performed. On the other hand, when the head 10 accesses the n+1-th track from the n-th track, the rough pitch shifting region 52 provided between the second and third fine steps 50 from the zero position of the n-th fine step portion 84 operates to provide the head 10 with a relatively abrupt displacement so that the head 10 shifts quickly from the n-th to n+1-th track position. Of course, the tracking control for the n+1-th track is made in the same way as the n-th track. The head access and tracking control for the n+2-th, n+3-th, . . . tracks are also made in the same manner.

Figure 5:
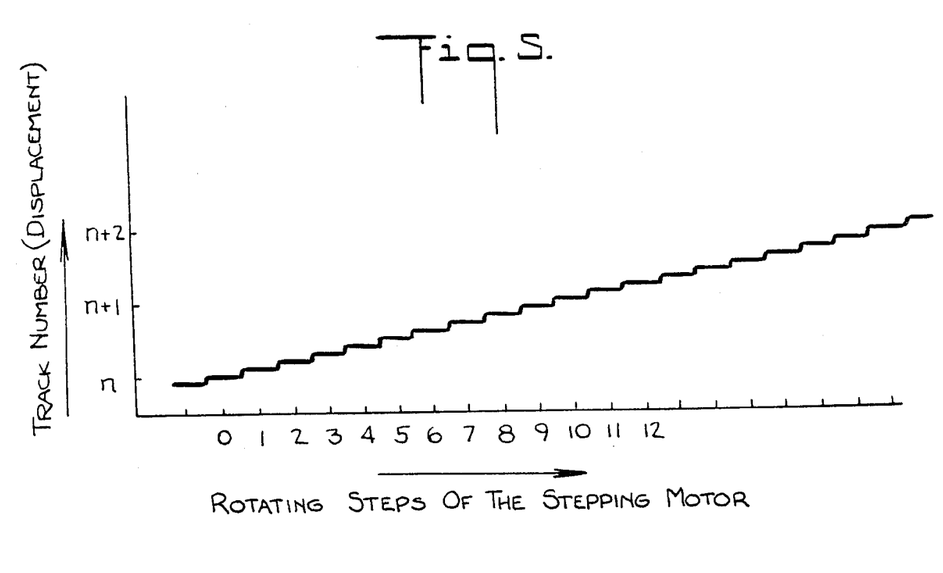
FIG. 5 is a graph showing the motion conversion characteristics of a conventional motion transmitting mechanism which does not have such characteristics as shown in FIG. 4.

The motion converting cam 41 is designed such that the fine step pitch shifting region 54 is provided in a predetermined range necessary for a fine shifting of the head in the direction of width of the track to facilitate an erasing operation and for tracking control (±2 steps in FIG. 2) around the standard or zero position of each track (step positions 0, 5, 10, ... in FIG. 4) and each rough pitch shifting region 52 is provided between two respective fine step pitch shifting regions 54. In this embodiment, inasmuch as each fine pitch shifting region 54 is formed by a plurality of fine steps 50 each having a pause range (a flat portion of the step), the influence of the ripple components of the rotation of the motor 30 (therefore the cam 41), if any, can be minimized to realize stable tracking at an optimum fine step. Moreover, it will be clearly understood how the speed of head access is increased by virtue of the rough pitch shifting regions 52 of the motion converting element according to the present invention, if the motion converting characteristics in FIG. 4 are compared with the characteristics in FIG. 5 of an ordinary cam formed with a fine step pitch shifting region only.

Figure 6:
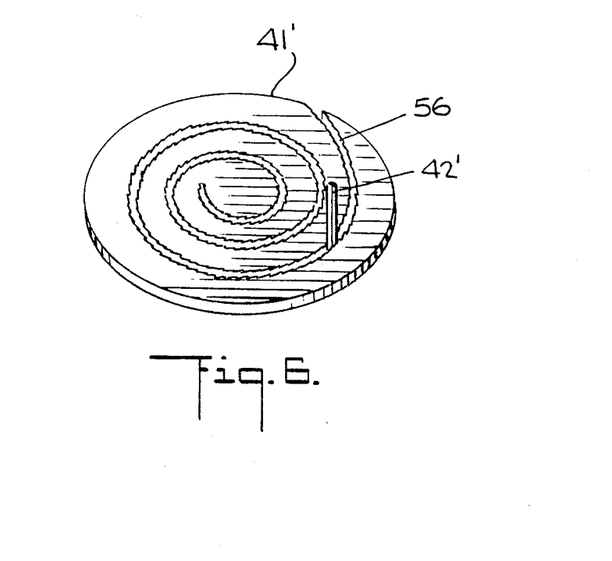
FIG. 6 is a perspective view showing a variation of the mechanism in FIG. 3 (a)

Many variations and modifications can be made with respect to the present mechanism. For example, the cam 41 and the cam follower 42 of the motion converting mechanism 40 of FIG. 3(a) may be replaced with a cam 41' having a spiral groove 56 and a pin-shaped cam follower 42' projecting into the groove, as shown in FIG. 6. The grooved cam 41' serves as a motion converting element and is formed to be mounted in the same manner as the cam 41 in FIG. 3(a) and rotatably driven by the stepping motor 30. The pin-shaped cam follower 42' is provided in place of the cam follower 42 on the head carriage 20 in FIG. 3(a). Clearly, the positional relationship between the grooved cam 41' and the cam follower 42' should be adjusted so that the tip of the cam follower 42' can trace the groove 56 of the cam 41' correctly. The cam groove 56 is formed to include fine step pitch shifting regions and rough pitch shifting regions in such a manner that the relationship between the angle of rotation of the cam 41' and the distance from the axis of rotation of the cam 41' to the position where the cam follower 42' slidably contacts the cam groove is identical to that shown in FIG. 4. Therefore, when the elements shown in FIG. 6 are used as a motion converting mechanism in a system pursuant to the present invention, the mechanism provides the same operation and effect as the embodiment described above with reference to FIGS. 3 and 4. Moreover, when the elements shown in FIG. 6 are used as a motion converting mechanism, biasing means 22 as shown in FIG. 3(a) can be omitted by selecting the shape and dimension of the groove properly.

As described above, the system for erasing a still video floppy disc according to the present invention has an advantage that when a frame-recorded track is erased, a pair of tracks corresponding to the frame are automatically erased, thereby preventing one of the tracks from remaining unerased.

What is claimed is:

1. A system for selectively erasing information recorded on at least one circular track of a plurality of successive tracks disposed laterally adjacent to one another and at least partially parallel to one another on a video floppy disc, said system comprising:
   head means juxtaposable to said floppy disc for picking up signals recorded on said tracks and for erasing signals from said tracks;
   detecting means operatively connected to said head means for detecting an ID code signal representing a record mode and picked up by said head means as a portion of a data group recorded on at least one of said tracks and for producing an output signal related to information content of said ID code signal;
   head accessing means operatively connected to said head means for advancing said head means;
   erasing signal generating means operatively coupled to said head means for generating an erasing signal and transmitting said erasing signal to said head means to erase selected data from said tracks; and
   control means operatively linked to said head accessing means, to said detecting means and to said erasing signal generating means for controlling sequential action of said head accessing means and said erasing signal generating means in response to said output signal from said detecting means.

2. A system in accordance with claim 1, wherein said control means controls said head accessing means and said erasing signal generating means so as to erase a pair of frame picture record tracks whenever said detecting means detects a frame record track based on the ID code.

3. A system in accordance with claim 1, wherein said head means comprises a magnetic head.

4. A system in accordance with claim 3, wherein said magnetic head is an in-line multiple type magnetic head.

5. A system in accordance with claim 4, wherein said head is an in-line type two-channel magnetic head.

6. A system in accordance with claim 11, wherein said head accessing means comprises:
   head support carriage for advancing said head means in a direction intersecting successive tracks formed on the floppy disc;
   driving force generating means for generating driving force to bring about a displacement of said head support carriage; and
   motion converting means operatively connected to said driving force generating means and to said head support carriage for converting an input motion from said driving force generating means to an output motion transmitted by said motion converting means to said head support carriage, said motion converting means having a motion conversion characteristic including a plurality of fine step pitch shifting regions spaced from each other and further including at least one rough pitch shifting region linking said fine step pitch shifting regions.

7. A system in accordance with claim 6, wherein said driving force generating means comprises a stepping motor.

8. A system in accordance with claim 6, wherein said motion converting means comprises a disc cam.

9. A system in accordance with claim 6, wherein said motion converting means comprises a grooved cam.

10. A system in accordance with claim 6, 7, 8 or 9, wherein said motion converting means influences the fine pitch advancing action of the head means utilizing said fine pitch shifting regions so as to erase an extended area over a regular track area designated to be erased.

* * * * *

UNITED STATES PATENT AND TRADEMARK OFFICE
CERTIFICATE OF CORRECTION

PATENT NO. : 4,816,935
DATED : March 28, 1989
INVENTOR(S) : Y. Toizumi, et al.

It is certified that error appears in the above-identified patent and that said Letters Patent is hereby corrected as shown below:

Column 1, lines 2 and 3, change headings so that "VIDEO FLOPPY SYSTEM" is on one line and "BACKGROUND OF THE INVENTION" is on a separate line.

Column 1, line 56, change "The two bit data "00" in the interval" to --The data "00" in the two bit interval--.

Column 2, line 22, between "of" and "unitary" insert --a--.

Column 2, line 35, between "system" and "com-" insert --pursuant to the invention--.

Column 2, lines 37 and 38, "to be erased...." should be continued on the same line after "whether a track".

Column 3, lines 31 and 32, "information distributively recorded." should be continued on the same line after "tions of the same".

UNITED STATES PATENT AND TRADEMARK OFFICE
CERTIFICATE OF CORRECTION

PATENT NO. : 4,816,935

DATED : March 28, 1989

INVENTOR(S) : Y. Toizumi, et al.

It is certified that error appears in the above-identified patent and that said Letters Patent is hereby corrected as shown below:

Column 5, line 63, omit "by".

Column 6, lines 63 and 64, "will be difficult..." should be continued on the same line after "speed head access"

Column 8, line 49, change "for example, $\pm 2$," to --for example, at $\pm 2$,--.

Column 9, lines 11 and 12, "is designed such" should be continued on the same line after "The motion converting cam 41".

Column 10, line 38, change "claim 11" to --claim 1--.

Signed and Sealed this

Eighth Day of May, 1990

*Attest:*

HARRY F. MANBECK, JR.

*Attesting Officer*　　*Commissioner of Patents and Trademarks*